3,276,113
METHOD OF BRAZING TUNGSTEN
Arthur G. Metcalfe, San Diego, Calif., assignor, by mesne assignments, to the United States of America as represented by the Secretary of the Navy
No Drawing. Filed June 27, 1963, Ser. No. 291,211
5 Claims. (Cl. 29—487)

The present invention relates generally to improvements in the art of brazing of metals and more particularly to a novel reactive brazing composition for joining metals such as tungsten.

In the past, the joining of tungsten elements by brazing to form a structure for use in high temperature environments has been impractical for several reasons, e.g., brazing with the usual alloys which melt below the recrystallization temperature of tungsten resulted in a joint having no high temperature strength, and brazing with a high melting alloy, if at all practical, resulted in a recrystallized, brittle tungsten structure.

Objects and features of this invention include a reactive braze technique for low temperature brazing of tungsten suitable for high temperature service.

Another object of the present invention is to provide a method of brazing and a braze alloy composition for uniting pieces of tungsten that provides a joint which has high temperature strength and does not become brittle under high temperature service.

Another object of the present invention is to provide a process wherein brazing may be carried out at a temperature below the recrystallization temperature of tungsten but will have a much higher remelt temperature.

A further object of the present invention is the provision of satisfactory tungsten joints which have useful strength retention in environments of elevated temperatures, i.e., including 4000° F.

Other objects and many of the attendant advantages of this invention will be readily appreciated as the same becomes better understood by reference to the following detailed description when considered in conjunction with the examples and tables.

These objects are accomplished by the utilization of a reactive braze system and technique. A reactive braze system is defined as one in which a reaction occurs to raise the melting temperature of the braze alloy. The present invention is particularly concerned with the basic platinum-boron-tungsten reactive braze system and certain additions thereto.

Platinum and boron form a eutectic at about 3.6 weight percent boron which alloy melts at about 1525° F. (830° C.). The reaction of a platinum-boron alloy with tungsten should proceed according to the theoretical equation: $Pt-B + W \rightarrow Pt(W) + W_2B$ in the presence of excess tungsten. Solution of tungsten in platinum is known to raise the peritectic melting temperature from 3216° F. (1769° C.) to 4460° F. (2460° C.)

To demonstrate the improved quality of the present brazing technique, studies have been made of brazed specimens, the results of which are hereinafter set forth in tabulated form.

Specimens that were brazed were composed of commercially pure tungsten sheet. Thicknesses were nominally 0.020, 0.030, and 0.040 inch. Material of the two thinner gages was hot sheared to size at a temperature of 800° to 1100° F., but the 0.040 inch sheet was cut with an abrasive wheel. Edges were dressed and one face was polished flat on No. 1 grade emery paper. After a hot alkaline pickle and distilled water rinse, the pieces were ready for brazing.

Braze alloys were prepared by melting the metals with boron in a recrystallized alumina crucible in an argon atmosphere. With the exception of the Pt-1.0 B alloy, all the braze alloys were readily crushed to powder with a hardened steel mortar and pestle to −100 mesh size.

Lap shear specimens were obtained by brazing two pieces of tungsten, 0.37 to 0.40 inch wide and about 1⅛ inch long. For tests at stresses to 200 p.s.i. shear, the lap was nominally ⅜ inch; for tests at higher stresses, the lap was reduced to ⅛ inch to prevent failure of the parent material.

With a few exceptions, all specimens were assembled with the powdered alloy (and tungsten powder addition, if any) preplaced in the joint. Assembly was accomplished by coating one faying surface with a thin film of binder such as polybutene and then spreading a measured quantity of alloy powder on the binder. If tungsten powder was to be added to the joint, it was placed on the other faying surface in a similar manner. The faying surfaces were then placed together and the two pieces of tungsten were held in position with a spring clip for insertion into the brazing atmosphere. After brazing, the outer ends of the specimen were warm-punched with 9/32 inch diameter holes for use in the tensile stress test equipment.

Some specimens were brazed by induction heating but the majority were brazed in a vacuum chamber resistance brazer. In the latter method, the specimen was held between graphite electrodes loaded by an air cylinder and heated electrically by passing a current through the electrodes and specimen. The heating rate and maximum temperature were controlled by adjusting a variable autotransformer which supplied the primary of a step-down transformer connected to the electrodes. Temperature of the specimen was read through a window of the vacuum chamber with a Leeds and Northrup optical pyrometer. Pressure in the chamber was reduced to approximately 0.2 torr with a mechanical pump before the heating cycle was started. The graphite electrodes may be modified by providing them with spherically seated tips. These tips insure that the joint is uniformly loaded during brazing and thus eliminates tapered joints encountered during use of the graphite electrodes.

It has been determined that the heating rate (above 25° F./min.) is not critical if tungsten powder (or equivalent tungsten sheet surface) is present in amounts less than 25 percent of the braze alloy. However, with larger percentages of tungsten, a heating rate over 200° F./min. is necessary to prevent reaction and sintering without flow. In the vacuum resistance braze, the heating rate at temperatures above 1400° F. was generally maintained at approximately 1000° F./min. to the brazing temperature. This rate is sufficiently rapid to obtain flow in all combinations of the platinum-boron alloy and tungsten powder.

Testing of lap shear specimens was carried out in a high-temperature, dead-load tensile test set-up. The specimen and surrounding tantalum foil susceptor were further surrounded by a stabilized zirconia tube and a mullite tube. The assembled parts were then enclosed by a Pyrex glass tube through which argon was circulated. One-eighth inch diameter holes in the tantalum susceptor, zirconia tube and mullite tube were aligned so that the temperature of the specimen could be read with an optical pyrometer. A 25-kilowatt generator connected to a coil outside the glass tube provided induction heating of the susceptor.

In testing, after the specimen was in place, the glass chamber was flushed with argon for about 5 minutes, and the calculated load placed on the load pan. Heating at the minimum setting of the induction generator (about 2000 watts) was continued for one minute resulting in a specimen temperature of about 1800° F. At this time, a rate control was energized to increase the power input to the induction coil at a fixed rate.

The remelt temperature of a joint was determined by loading a ⅜ inch by ⅜ inch lap area to nominally 20 p.s.i. average stress and heating as described until separation of the joint occurred.

The temperature at which joints separated under load was also determined; 200 p.s.i. and 800 p.s.i. being used as average shear stresses on the lap area. For remelt tests and 200 p.s.i. shear tests, specimens comprising 0.020 tungsten with a ⅜ inch lap were used. For 800 p.s.i. shear tests, it was necessary to use tungsten specimens having thickness of 0.030 to 0.040 inch with a ⅛ inch lap to prevent failure in the parent metal prior to joint separation.

The results of remelt temperature determinations are given in Tables I through V for the platinum-boron alloys. Specimens brazed with Pt-1.0B were made without tungsten powder additions and the braze cycle was varied. Specimens brazed with the other alloys were brazed at 2000° F. for 5 seconds, both with and without tungsten powder additions.

TABLE I.—REMELT TEMPERATURES OF JOINTS BRAZED WITH Pt-1.0B ALLOY

[⅜ inch by ⅜ inch lap, 48 mg. alloy. Not diffused; no tungsten powder addition]

| Specimen No. | Braze Cycle | Remelt Temperature (° F.) |
| --- | --- | --- |
| 183 | 2,000° F., 15 sec | 3,340 |
| 184 | 2,000° F., 60 sec | 3,740 |
| 185 | 2,100° F., 60 sec | 3,820 |
| 186 | 2,200° F., 30 sec | 3,820 |
| 187 | 2,200° F., 60 sec | 3,840 |

TABLE II.—REMELT TEMPERATURE OF JOINTS BRAZED WITH Pt-2.15B ALLOY

[⅜ inch by ⅜ inch lap, 48 mg. alloy. Braze cycle: 2,000° F., 5 sec.]

| Specimen No. | Diffusion Treatment | Weight of Tungsten Powder (mg.) | Remelt Temperature (° F.) | Heating Time to Separation (min.-sec.) |
| --- | --- | --- | --- | --- |
| 150 | None | 0 | 3,820 | 4-0 |
| 151 | do | 6 | 3,770 | 3-50 |
| 152 | do | 12 | 3,710 | 3-45 |
| 153 | do | 20 | 3,710 | 3-40 |
| 150D | 2,000° F., 3 hrs | 0 | 3,770 | 3-45 |
| 151D | 2,000° F., 3 hrs | 6 | 3,690 | 3-45 |
| 152D | 2,000° F., 3 hrs | 12 | 3,800 | 4-0 |
| 153D | 2,000° F., 3 hrs | 20 | 3,720 | 3-45 |

TABLE III.—REMELT TEMPERATURE OF JOINTS BRAZED WITH Pt-3.0B ALLOY

[⅜ inch by ⅜ inch lap, 48 mg. alloy. Braze cycle: 2,000° F., 5 sec.]

| Specimen No. | Diffusion Treatment | Weight of Tungsten Powder (mg.) | Remelt Temperature (° F.) | Heating Time to Separation (min.-sec.) |
| --- | --- | --- | --- | --- |
| 1 | None | 12 | 3,680 | 3-30 |
| 2 | do | 20 | 3,340 | 2-29 |
| 3 | do | 26 | 3,290 | 2-40 |
| 11 | 2,000° F., 3 hrs | 0 | 3,840 | 3-51 |
| 23 | 2,000° F., 3 hrs | 6 | 3,870 | 3-45 |
| 24 | 2,000° F., 3 hrs | 6 | 3,840 | 3-48 |
| 12 | 2,000° F., 3 hrs | 12 | 3,870 | 3-31 |
| 13 | 2,000° F., 3 hrs | 20 | 3,520 | 3-01 |
| 14 | 2,000° F., 3 hrs | 26 | (¹) | |

¹ Tungsten cracked during diffusion treatment.

TABLE IV.—REMELT TEMPERATURE OF JOINTS BRAZED WITH Pt-3.6B ALLOY

[⅜ inch by ⅜ inch lap, 48 mg. alloy. Braze cycle: 2,000° F., 5 sec.]

| Specimen No. | Diffusion Treatment | Weight of Tungsten Powder (mg.) | Remelt Temperature (° F.) | Heating Time to Separation (min.-sec.) |
| --- | --- | --- | --- | --- |
| 4 | None | 12 | 3,380 | 3-05 |
| 5 | do | 20 | 3,570 | 3-16 |
| 6 | do | 20 | 2,970 | 2-40 |
| 7 | do | 26 | 3,200 | 2-45 |
| 15 | 2,000° F., 3 hrs | 0 | 3,750 | 3-25 |
| 25 | 2,000° F., 3 hrs | 6 | 3,930 | 4-0 |
| 26 | 2,000° F., 3 hrs | 6 | 3,930 | 4-15 |
| 16 | 2,000° F., 3 hrs | 12 | 3,800 | 3-20 |
| 17 | 2,000° F., 3 hrs | 20 | 3,560 | 3-10 |
| 18 | 2,000° F., 3 hrs | 26 | 3,380 | 3-17 |

TABLE V.—REMELT TEMPERATURE OF JOINTS BRAZED WITH Pt-4.5B ALLOY

[⅜ inch by ⅜ inch lap, 48 mg. alloy. Braze cycle: 2,000° F., 5 sec.]

| Specimen No. | Diffusion Treatment | Weight of Tungsten Powder (mg.) | Remelt Temperature (° F.) | Heating Time to Separation (min.-sec.) |
| --- | --- | --- | --- | --- |
| 8 | None | 12 | 3,780 | 3-27 |
| 9 | do | 20 | 3,560 | 3-05 |
| 10 | do | 26 | 3,370 | 2-56 |
| 19 | 2,000° F., 3 hrs | 0 | 3,720 | 3-25 |
| 27 | 2,000° F., 3 hrs | 6 | 3,850 | 3-45 |
| 20 | 2,000° F., 3 hrs | 12 | ¹ 3,660 | 4-35 |
| 28 | 2,000° F., 3 hrs | 12 | 3,790 | 3-30 |
| 21 | 2,000° F., 3 hrs | 20 | ¹ 3,510 | 3-52 |
| 29 | 2,000° F., 3 hrs | 20 | 3,740 | 3-30 |
| 22 | 2,000° F., 3 hrs | 26 | 3,820 | 3-14 |
| 30 | 2,000° F., 3 hrs | 26 | 3,720 | 3-30 |
| 31 | 2,000° F., 3 hrs | 30 | 3,750 | 3-30 |

¹ Failure in parent material.

The remelt temperature determinations indicate two primary points of interest; that the maximum remelt temperature obtainable with the platinum-boron alloys in the composition range used was essentially independent of the alloy, and that tungsten powder additions did not appreciably affect the maximum remelt temperature obtainable. The maximum remelt temperature was about 3800° to 3900° F., within the probable limits of experimental error. This temperature is well above the melting temperature of platinum (3216° F.), but also is well below the platinum-tungsten peritectic (4460° F.). Methods of improving the remelt capabilities of the reactive braze are discussed hereinafter.

In the platinum-boron-tungsten reactive braze system, a diffusion treatment following brazing improves the remelt temperature through one or both of two actions, i.e., either by promoting the completion of the reaction of boron with tungsten, or by increasing the amount of tungsten dissolved in the platinum. Because of the limited time normally used for brazing and the limited temperature that can be used without recrystallization of the tungsten occurring, neither the boron-tungsten reaction nor solution of tungsten in the platinum may be complete in the as-brazed joint. Although the effectiveness of a diffusion treatment may be dependent upon the diffusion distance involved, all diffusion treatments were carried out on specimens in which the joint gap was a nominal 0.0005 inch in order that the testing variables might be minimized. Both long and short term diffusion treatments were investigated. The effect of short, three-hour diffusion treatments at 2000° F. are indicated (Table II) for specimens brazed with platinum-2.15 boron alloy.

For this treatment, the specimens had a very short braze time (5 secs.) and the diffusion temperature was the same as the braze temperature. Similar tests on diffusion treated specimens brazed with platinum-3.0 boron, platinum-3.6 boron and platinum-4.5 boron alloys are set forth in Tables III, IV and V.

The 24 hour diffusion treatment at 2000° F. was applied to a series of specimens having various braze cycles with and without tungsten powder addition to the joint. The separation temperatures observed when the specimens were tested at 800 p.s.i. shear stress are listed in Table VI.

TABLE VI.—SEPARATION TEMPERATURES AT 800 P.S.I. SHEAR STRESS
[Brazed with Pt-2.15B alloy]

| Braze Cycle | Diffusion Treatment | Addition of 0.7-0.9 W powder to 48 mg. Alloy (° F.) | | | |
|---|---|---|---|---|---|
| | | 0 | 6 mg. | 12 mg. | 20 mg. |
| 1,600° F., 480 sec | None | 2,150 | | | |
| 1,800° F., 200 sec | do | 2,820 | 2,840 | 1,900 | 2,270 |
| | | 2,970 | | | |
| | | 2,965 | | | |
| 1,800° F., 200 sec | 24 hr., 2,000° F | 3,510 | 2,700 | 2,840 | 2,850 |
| 2,000° F., 15 sec | None | 2,100 | 1,800 | 1,800 | 1,800 |
| 2,000° F., 15 sec | 24 hr., 2,000° F | 2,850 | 2,750 | 2,710 | 2,775 |
| 2,000° F., 60 sec | None | 3,040 | 2,760 | 2,850 | 2,640 |
| | | 3,160 | | | |
| 2,000° F., 60 sec | 24 hr., 2,000° F | 3,670 | 2,910 | 2,870 | 2,820 |
| 2,000° F., 200 sec | None | 3,090 | 2,630 | 2,620 | 2,780 |
| 2,000° F., 200 sec | 24 hr., 2,000° F | 3,495 | 3,020 | 3,030 | 2,810 |
| 2,200° F., 60 sec | None | 3,790 | 2,870 | 3,050 | 2,770 |
| 2,200° F., 60 sec | 24 hr., 2,000° F | 3,740 | 2,920 | 3,080 | 2,900 |

The long diffusion treatment generally improved the temperature capability at 800 p.s.i. shear of the diffused joints over the as-brazed joints.

The solution of tungsten in the platinum which raised the service temperature capability of the joint above the melting temperature of platinum is also affected by time, temperature, and diffusion distance. Intuitively, a minimum joint thickness provides the best conditions from the standpoint of the reactive system. Two specimens brazed with platinum-2.15 boron alloy, one with a .0015" gap, the other with a .006" gap failed at 3840° F. and 2100° F., respectively. Two specimens were also brazed with a gap of .003" using platinum-2.15 boron alloy and 17% tungsten powder addition. These specimens separated at 3270° F. and 3450° F. indicating the beneficial effect of the tungsten powder filler on the remelt properties of the wider gaps. The platinum-boron alloys having boron contents from 1.0 to 4.5% were found to all flow well if the amount of tungsten powder addition was not too large.

Further analysis of the brazed joints, with or without additions, led to the conclusion that remelt temperature depends primarily on some aspect of the tungsten-boron system rather than the metallic component of the braze alloy. The melting temperature of tungsten boride ($W_2B$) is 3450° F. (1900° C.) and, in the presence of massive tungsten base metal, a certain amount of this boride is present in any joint brazed with a boron-containing alloy. X-ray diffraction examination of the failure surface area of the braze alloy (specimen 153D, Table II) indicates the presence of only platinum containing dissolved tungsten and gamma tungsten boride ($W_2B$). This evidence that the controlling factor in fixing maximum remelt temperature was the relatively low melting point of $W_2B$ prompted effort to reduce the formation of gamma tungsten boride.

One approach to the problem of reducing the formation of $W_2B$ involved the possibility of removal of the boron to a low level during the brazing operation. Boron halides, especially the fluoride and chloride, are volatile. This characteristic greatly facilitated the reaction of the boron with a fluoride or chloride addition to the braze alloy. Several salts were selected for a trial based on the requirements that they were stable at temperatures up to and including those in the brazing range, and that the cationic element freed by the reaction was not detrimental. These salts were in general fluorides or chlorides of the Group I-A and II (alkali) metals since these metals would readily volatize in a vacuum at a temperature used for brazing. Test results made on specimens brazed with platinum-2.15 boron alloy plus halide additions are listed in Table VII.

TABLE VII.—SEPARATION TEMPERATURE OF JOINTS BRAZED WITH Pt-2.15B ALLOY WITH HALIDE ADDITIONS

| Specimen No. | Halide Addition (to 48 mg. alloy) | Braze Cycle | Diffusion Treatment | Stress (p.s.i.) | Separation Temperature (° F.) |
|---|---|---|---|---|---|
| 213-1 | LiF, 7.4 mg | 1,800° F., 200 sec | None | 20 | 3,830 |
| 213-2 | LiF, 7.4 mg | 1,800° F., 200 sec | do | 20 | 3,870 |
| 213-3 | LiF, 7.4 mg | 1,800° F., 200 sec | do | 20 | 3,830 |
| 213-4 | LiF, 15 mg | 1,800° F., 400 sec | do | 20 | 3,995 |
| 213-5 | LiF, 25 mg | 1,800° F., 400 sec | do | 20 | 3,995 |
| 213-6 | LiF, 25 mg | 1,800° F., 600 sec | do | 20 | 3,820 |
| 213-7 | LiF, 25 mg | 1,600° F., 900 sec | do | 20 | 3,940 |
| 215 | NaCl, 29 mg | 2,000° F., 60 sec | do | 20 | [1] 4,200 |
| 217-1 | NaF, 21 mg | 2,000° F., 60 sec | do | 20 | 4,300 |
| 217-2 | NaF, 21 mg | 2,000° F., 60 sec | do | 20 | 4,250 |
| 220-4 | NaF, 21 mg | 2,000° F., 60 sec | 2,000° F., 24 hr | 20 | 4,220 |
| 216 | KCl, 37 mg | 2,000° F., 60 sec | 2,000° F., 24 hr | 20 | 3,930 |
| 218 | KHF₂, 29 mg | 2,000° F., 60 sec | None | 20 | 4,300 |
| 221-2 | KHF₂, 29 mg | 2,000° F., 60 sec | 2,000° F., 24 hr | 20 | 3,750 |
| 212 | MgCl₂, 12 mg | 1,800° F., 200 sec | 2,000° F., 24 hr | 20 | 2,730 |
| 220-1 | NaF, 21 mg | 2,000° F., 60 sec | None | 800 | 2,000 |
| 220-2 | NaF, 21 mg | 2,000° F., 60 sec | 2,000° F., 24 hr | 800 | 3,180 |
| 221-1 | KHF₂, 29 mg | 2,000° F., 60 sec | None | 800 | 2,980 |
| 221-3 | KHF₂, 29 mg | 2,000° F., 60 sec | 2,000° F., 24 hr | 800 | 2,840 |

[1] Did not separate. Failed at 3,980° F. on reheating.

X-ray diffraction examination of the separation surface of specimen 217 indicated a much lower intensity of $W_2B$ than was present in the aforementioned specimen 213D. Thus, the capability of raising the maximum remelt to over 4300° F. is demonstrated with the platinum-boron system.

As has been noted above, the brazed joints of the invention possess useful mechanical properties such as both room temperature and high temperature strength thus permitting broader application of brazed tungsten in aerospace technology. The representative data in the accompanying tables serves to illustrate the desirable mechanical properties of these joints.

Thus, the objects and features of this invention are accomplished in that there are satisfactory tungsten brazes that can be made with platinum-boron alloys having boron content between 1.0 and 4.5 weight percent; about 2% being preferable. It is also apparent that the addition of tungsten powder to a braze alloy is beneficial when the joint gap is .0015" or wider. In addition, the brazed joints are improved by diffusion treatments in the event of less than optimum brazing conditions and in the presence of wide gap joints. Difusion treatments are also effective to improve the load carrying ability of the joints. It is further concluded that the optimum joint gap is the minimum in which the alloy will flow. Although high remelt separation temperatures are obtained by using the platinum-boron reactive braze system, the temperature is limited by the presence of gamma tungsten boride. The addition of certain halide salts to this platinum-boron alloy can raise the remelt temperature from 3800° F. to above 4200° F. by limiting the formation of $W_2B$.

Many changes and modifications can be made in the above described details without departing from the nature and spirit of the invention. For example, iridium, titanium and zirconium may be alloyed with platinum and boron; or iridium used as a replacement for platinum and, in addition, may be alloyed with osmium, rhenium or ruthenium. These reactive braze alloys were not found to be superior to the platinum-boron system of the present invention. It is to be understood therefore that the invention is not to be limited to said details except as set forth in appended claims.

What is claimed is:
1. The method of joining tungsten elements at low temperature including the steps of:
   placing an alloy comprising essentially 1.0 to 4.5 weight percent boron remainder platinum between elements to be joined,
   heating said elements and alloy at a rate of at least 25° F. per minute up to at least 2000° F., and
   subjecting the elements and alloy to a brazing temperature of about 2000° F. for a period of about 5 to 60 seconds, whereby said elements are effectively joined together, which joint is capable of withstanding temperatures substantially above 2000° F. without remelting.
2. The method according to claim 1 wherein said elements and alloy are heated at a rate of at least 200° F. per minute for preventing reaction and sintering without alloy flow.
3. The method according to claim 2 including placing powdered tungsten between said elements for promoting the solution of tungsten in platinum and the completion of the tungsten-boron reaction.
4. The method according to claim 1 including:
   subjecting the joined elements to a diffusion treatment at about 2000° F. for three hours, and
   thereafter maintaining said elements at the diffusion temperature for up to 21 additional hours.
5. The method according to claim 1 wherein the process is carried out in a vacuum, and including the step of incorporating with said alloy a halide salt selected from the chloride and fluoride salts of the Group I-A and Group II metals which halide salt and boron react to form boron halide and a metal both of which are volatile in the brazing environment vacuity.

References Cited by the Examiner
UNITED STATES PATENTS

| | | | |
|---|---|---|---|
| 1,753,161 | 4/1930 | Woodward | 75—172 |
| 1,779,603 | 10/1930 | Kingsbury | 75—172 |
| 2,224,952 | 12/1940 | Dilley | 29—500 |
| 2,598,027 | 5/1952 | Weir | 29—500 |
| 2,870,527 | 1/1959 | Yntema | 29—198 |
| 2,924,004 | 2/1960 | Wehrman | 29—198 |

JOHN F. CAMPBELL, *Primary Examiner.*

HYLAND BIZOT, *Examiner.*